United States Patent
König et al.

(10) Patent No.: US 9,566,541 B2
(45) Date of Patent: Feb. 14, 2017

(54) OIL SIDE-STREAM CLEANING DEVICE

(71) Applicant: MAN Diesel & Turbo SE, Augsburg (DE)

(72) Inventors: Nikolaus König, Althegnenberg (DE); Florian Gruschwitz, Augsburg (DE)

(73) Assignee: MAN Diesel & Turbo SE, Augsburg (DE)

( * ) Notice: Subject to any disclaimer, the term of this patent is extended or adjusted under 35 U.S.C. 154(b) by 1003 days.

(21) Appl. No.: 13/680,482

(22) Filed: Nov. 19, 2012

(65) Prior Publication Data
US 2013/0126408 A1 May 23, 2013

(30) Foreign Application Priority Data
Nov. 18, 2011 (DE) .......................... 10 2011 086 670

(51) Int. Cl.
| | | |
|---|---|---|
| *B01D 29/68* | (2006.01) | |
| *F01M 11/03* | (2006.01) | |
| *B01D 29/62* | (2006.01) | |
| *B01D 29/00* | (2006.01) | |
| *F01M 5/00* | (2006.01) | |
| *B01D 29/64* | (2006.01) | |

(52) U.S. Cl.
CPC ............... *B01D 29/62* (2013.01); *B01D 29/00* (2013.01); *B01D 29/682* (2013.01); *F01M 5/001* (2013.01); *F01M 11/03* (2013.01); *B01D 29/6446* (2013.01); *B01D 2201/082* (2013.01); *F01M 2011/033* (2013.01)

(58) Field of Classification Search
CPC ................................................ F01M 2011/033
See application file for complete search history.

(56) References Cited

U.S. PATENT DOCUMENTS

| | | | | |
|---|---|---|---|---|
| 3,339,736 A | * | 9/1967 | Muller | B01D 17/0208 210/104 |
| 3,574,509 A | | 4/1971 | Zentis et al. | |
| 3,784,016 A | | 1/1974 | Akiyama | |
| 6,024,880 A | | 2/2000 | Ciora, Jr. et al. | |
| 6,136,202 A | * | 10/2000 | Foreman | B01D 33/073 210/107 |

(Continued)

FOREIGN PATENT DOCUMENTS

| | | |
|---|---|---|
| DE | 2 231 904 | 1/1973 |
| DE | 44 00 485 | 4/1995 |

(Continued)

*Primary Examiner* — Thomas M Lithgow
(74) *Attorney, Agent, or Firm* — Cozen O'Connor

(57) ABSTRACT

The oil side-flow cleaning device includes a heating unit (11) installed between the oil tank and the filter unit (10) so that, when the oil temperature is below a defined limit value, oil flows through the filter unit (10) in such a way as to bypass the filtering function and is heated; and so that, when the oil temperature is above the defined limit, oil flows through the filter unit (10) so as to be subjected to the oil filtering function. In addition or as an alternative, the oil side-flow cleaning device comprises a backflush unit including a backflush collecting tank (17) and a backflush nozzle (18), wherein, when the device is in backflush mode, oil flows through the filter medium (16) in a second, opposite direction as a function of the position of the backflush nozzle (18) relative to the filter medium (16).

5 Claims, 2 Drawing Sheets

(56) References Cited

U.S. PATENT DOCUMENTS

| | | | | |
|---|---|---|---|---|
| 6,337,013 B1* | 1/2002 | Koopmans | ............ | B01D 29/23 |
| | | | | 210/232 |
| 6,368,513 B1* | 4/2002 | Christophe | ............ | B01D 29/23 |
| | | | | 210/295 |
| 2009/0107904 A1* | 4/2009 | Mangano | ............... | B01D 29/23 |
| | | | | 210/232 |

FOREIGN PATENT DOCUMENTS

| | | |
|---|---|---|
| DE | 10333058 | 2/2005 |
| DE | 10 2007 044 524 | 3/2009 |
| WO | WO 2008/147785 | 12/2008 |

* cited by examiner

OIL SIDE-STREAM CLEANING DEVICE

BACKGROUND OF THE INVENTION

1. Field of the Invention

The invention pertains to an oil partial flow cleaning device.

2. Description of the Related Art

FIG. 1 shows the basic design of a prior-art oil system 1 of an internal combustion engine, preferably of a marine diesel internal combustion engine of a ship. The device described in the following is suitable for use not only in marine diesel engines but also, of course, in stationary engines such as those present in a diesel engine power plant, which is a typical application. Thus the oil system shown in FIG. 1 comprises an oil tank 2, in which oil is kept, wherein the oil held in the oil tank 2 is supplied through a feed line 4 to an internal combustion engine 3 to lubricate it and can be returned to the oil tank 2 through a return line 5, wherein the feed line 4 and the return line 5 form the so-called main flow or main circuit of the oil system 1. The oil system 1 of FIG. 1 also comprises a cleaning device 6 for the oil, wherein this oil cleaning device 6 is designed as a so-called oil side-flow or partial flow cleaning device. Thus the oil side-flow cleaning device 6 can be supplied with the oil to be cleaned through a feed line 7 proceeding from the oil tank, wherein the oil cleaned in the oil side-flow cleaning device 6 can be returned to the oil tank 2 through a return line 8. As previously mentioned, the feed line 4 and the return line 5, which are connected to the internal combustion engine 3 and to the oil tank 2, form the main flow of the oil system 1. The feed line 7 and the return line 8, which are connected to the oil partial flow cleaning device 6 and to the oil tank 2, form the partial flow or side-flow of the oil system 1. Particles removed from the oil can be discharged from the oil system 1 through a dirt discharge line 9 in the area of the oil partial flow cleaning device 6.

An oil partial flow cleaning device with a centrifuge is known from the prior art DE 103 33 058 A1.

Proceeding from that prior art, the goal of the invention is to create a novel oil side-flow cleaning device.

SUMMARY OF THE INVENTION

This goal is achieved according to a first aspect of the present invention by an oil partial flow cleaning device which comprises a heating unit for the oil to be cleaned, which heating unit is installed between the oil tank and the filter unit so that, when the oil temperature is below a defined limit value and the device is thus in "filtration preparation mode", oil flows through the filter unit in such a way that it bypasses the filtering function and is heated, or so that, when the oil temperature is above the defined limit value and the device is thus in "filtration mode", oil flows through the filter unit in such a way that the oil is subjected to the filtering function.

According to a second aspect of the invention, the goal is achieved by an oil side-flow cleaning device which comprises a backflush unit for the filter unit comprising a backflush collecting tank and a backflush nozzle, wherein, when the device is in backflush mode, oil flows through the filter medium as a function of the position of the backflush nozzle relative to the filter medium and arrives in the backflush collecting tank.

The two aspects of the present invention, which can be used either alone or preferably in combination with each other, constitute an oil partial flow cleaning device of greater effectiveness.

The heating unit provided according to a first aspect of the invention offers an easy and reliable way of giving the oil the desired temperature for filtration mode. This increases the effectiveness of the oil side-flow cleaning device. The backflush unit provided according to the second aspect of the invention, which comprises at least the backflush collecting tank and the backflush nozzle, can guarantee an effective backflush filter unit, as a result of which the effectiveness of the oil side-flow cleaning device can be further increased.

The backflush unit preferably comprises a backflush receiving tank, wherein, when the device is in filtration mode, the backflush receiving tank can first be filled with cleaned oil, which flows through the filter medium in a first direction, and then the cleaned oil can be returned from the backflush receiving tank to the oil tank, and wherein, when the device is in backflush mode, cleaned oil can be conveyed from the backflush receiving tank, through the filter medium in the second direction as a function of the position of the backflush nozzle relative to the filter medium, and to the backflush collecting tank. The backflush achieved by the cleaned oil collected in the backflush receiving tank is especially effective.

According to an advantageous embodiment of the invention, the backflush unit comprises an oil recovery unit, which cooperates with the backflush collecting tank. The oil recovery unit makes it possible to recover the oil used for backflushing and to return it to the oil circuit. This also leads to an increase in the effectiveness of the oil partial flow cleaning device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention are explained in greater detail with reference to the drawings, in which.

DETAILED DESCRIPTION OF THE PRESENTLY PREFERRED EMBODIMENTS

The present invention pertains to an oil side-flow or partial flow cleaning device 6 for cleaning the oil to be supplied to an internal combustion engine 3, especially a marine diesel internal combustion engine, wherein the cleaning of the oil by the oil side-flow cleaning device 6 takes place not in the so-called main flow but rather in the so-called side or partial flow of the oil system.

Figure 1:
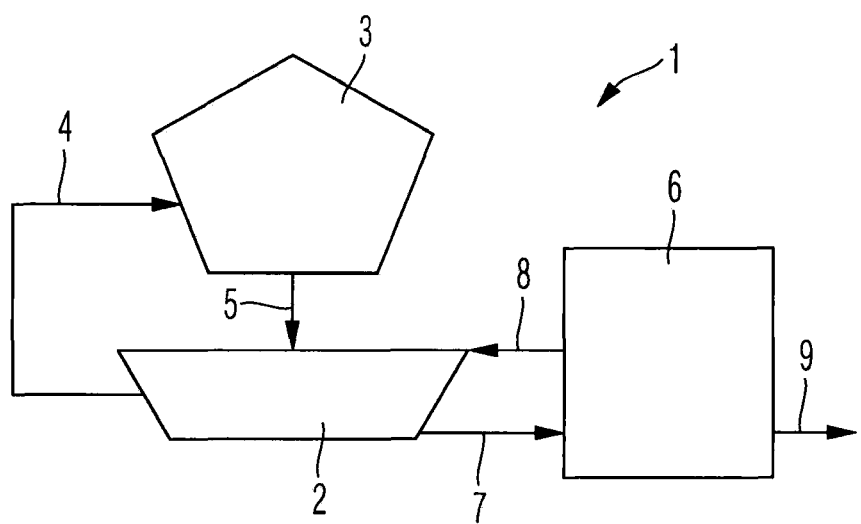
FIG. 1 shows a schematic diagram of a prior art oil system with an oil side-flow cleaning device.
Figure 2:
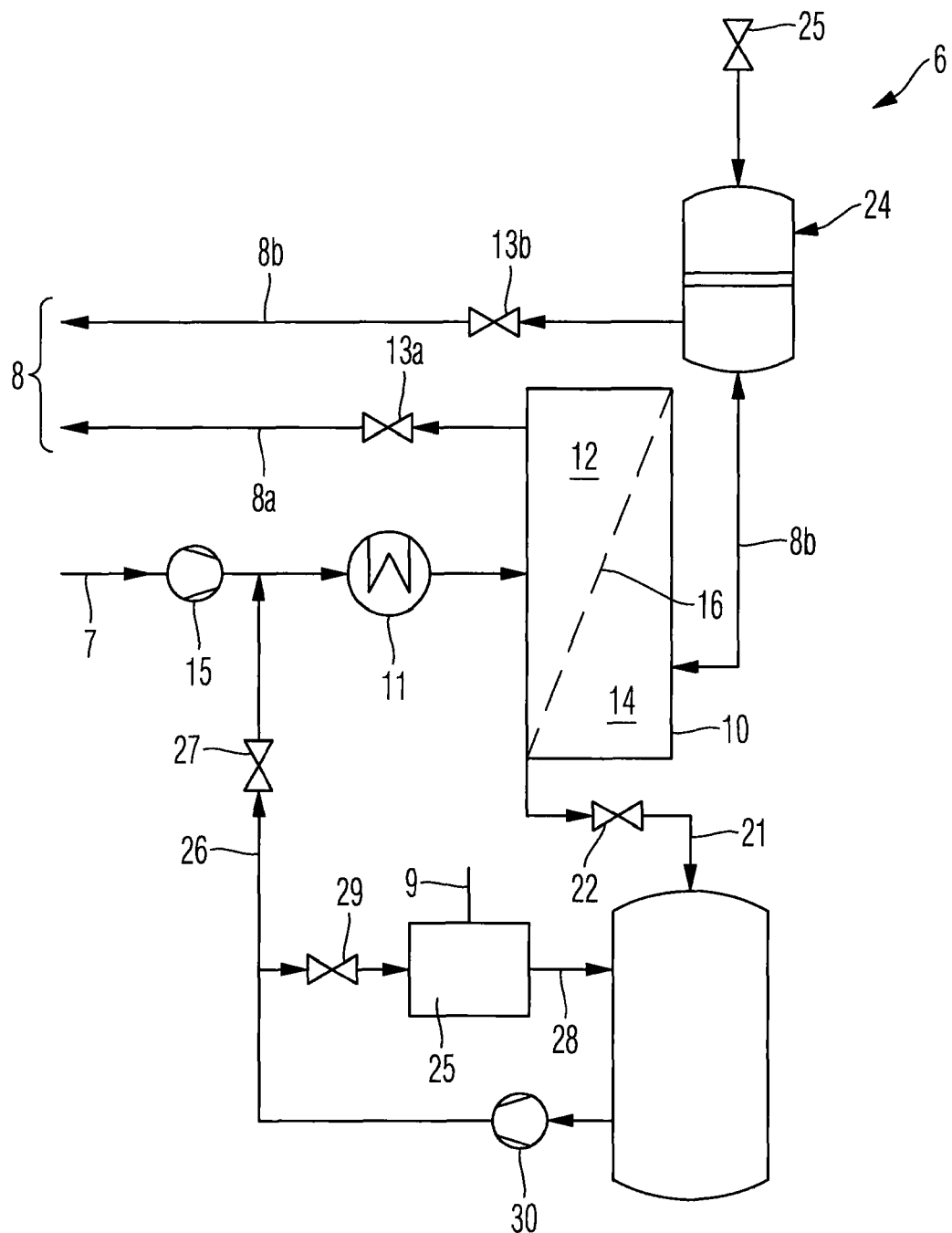
FIG. 2 shows a schematic diagram of an oil side-flow cleaning device according to the invention.

FIG. 2 shows the basic layout of a preferred embodiment of an inventive oil side-flow cleaning device 6. As previously mentioned in connection with FIG. 1, the oil side-flow cleaning device 6 can be connected to an oil tank (not shown in FIG. 2) by way of a feed line 7 and a return line 8. The oil to be cleaned can be sent from the oil tank 2 to the oil side-flow cleaning device 6 via the feed line 7. Cleaned oil can be sent back from the oil side-flow cleaning device 6 to the oil tank 2 via the return line 8.

According to FIG. 2, the oil side-flow cleaning device 6 comprises a filter unit 10. The filter unit 10 is what actually filters the oil to be cleaned, wherein the filter unit 10 can be connected to the oil tank 2 (not shown in FIG. 2) by way of the feed line 7 and the return line 8.

According to FIG. 2, the inventive oil side-flow cleaning device 6 also comprises a heating unit 11. The heating unit 11 serves to heat the oil to be cleaned and is installed in feed line 7.

The heating unit 11 is installed in the feed line 7 between the filter unit 10 and oil tank 2 (not shown), so that, when the oil temperature is below a defined limit value and the oil side-flow cleaning device 6 is thus in so-called "filtration preparation mode", the oil flows through the filter unit 10 in such a way that it bypasses the filtering function and is heated. For this purpose, one side of a first oil chamber 12 of the filter unit 10, which serves to receive the oil to be cleaned, can be connected to the oil tank 2 via the feed line 7, and the other side can be connected to the tank via a first return line 8a of the return line 8.

A first shutoff element 13a is assigned to the first return line 8a, through which oil is conveyed through the filter unit 10 in such a way that it bypasses the filtering function of the filter unit 10.

When the oil temperature of the oil is above the defined limit value and the device is thus in filtration mode, the filter unit 10 can be supplied with oil in such a way that use is made of the filtering function of the unit, for which purpose a second oil chamber 14 of the filter unit 10, which serves to hold cleaned oil, can also be connected to the oil tank 2 by a second return line 8b of the return line 8.

A second shutoff element 13b is assigned to the second return line 8b, through which oil which has been subjected to the filtering function of the filter unit 10 can be returned to oil tank 2.

When the oil side-flow cleaning device 6 is in filtration preparation mode, that is, when the oil temperature is below the limit value, the first shutoff element 13a is opened and the second shutoff element 13b is closed, so that the oil to be cleaned can now be sent via the feed line 7 and the heating unit 11 exclusively to the first oil chamber 12 of the filter unit 10, thus bypassing the filtering function of the filter unit 10, and then via the first return line 8a back to the oil tank 2. This continues until the oil temperature exceeds the corresponding limit value. When the oil temperature rises above the limit value, the oil side-flow cleaning device 6 enters filtration mode, in which the first shutoff element 13a is closed and the second shutoff element 13b is opened, so that the oil to be cleaned can be sent via the feed line 7 to the first oil chamber 12, and so that the cleaned oil can be sent from the second oil chamber 14 of the filter unit 10 back to the oil tank 2 via the second return line 8b of the return line 8.

To convey the oil, a feed pump 15 is assigned to the feed line 7 upstream of the heating unit 11, as shown in FIG. 2.

The first oil chamber 12 and the second oil chamber 14 of the filter unit 10 are separated from each other by a filter medium 16. When the device is in filtration mode, oil flows through this filter medium 16 in such a way that the oil to be cleaned proceeds from the first oil chamber 12, is cleaned, and arrives in the second oil chamber 14, wherein the particles to be removed from the oil to be cleaned are retained by the filter medium 16.

The filter medium 16 can be, for example, a nonwoven filter material, which ensures a high dirt-holding capacity for the particles to be removed and which at the same time is able to separate particles only a few micrometers in size.

The details described above are able to guarantee that filtration occurs only when the oil to be cleaned has a suitable oil temperature. This has the effect of increasing the effectiveness of the oil side-flow cleaning device 6.

These measures can also make it possible to preheat the oil in the oil tank 2 for the purpose of, for example, supplying oil at a temperature suitable for a cold start of the internal combustion engine.

To increase the effectiveness of the oil side-flow cleaning device 6 even more, the feed line 7 and the second return line 8b can be connected by way of a heat exchanger (not shown). This means that, when the device is in filtration mode, there will be a thermal coupling between the unfiltered oil stream and the filtered oil stream, as a result of which thermal energy of the filtered oil can be transferred to the unfiltered oil.

The inventive oil side-flow cleaning device 6 also comprises a backflush unit, which comprises at least a backflush collecting tank 17 and a backflush nozzle 18. As already explained, when the oil side-flow cleaning device 6 is in filtration mode, oil flows through it in such a way that the oil to be cleaned flows from the first oil chamber 12 into the area of the second oil chamber 14 of the filter unit 10, wherein the oil flows through the filter medium 16 of the filter unit 10 in a first direction 19 (see FIG. 3).

When the oil side-flow cleaning device 6 is in backflush mode, oil flows through the filter medium 16 in the opposite, second direction 20 (see FIG. 3) as a function of the position of the backflush nozzle 18 relative to the filter medium 16 and then arrives in the backflush collecting tank 17.

It can be derived from FIG. 2 that the backflush collecting tank 17 is connected to the filter unit 10 by an oil line 21, to which a shutoff element 22 is assigned, wherein this shutoff element 22 is closed both when the oil side-flow cleaning device 6 is in filtration mode and when it is in filtration preparation mode, and wherein, when the oil side-flow cleaning device 6 is in backflush mode, this shutoff element 22 is opened to allow the backflushing of the filter medium 16.

Figure 3:
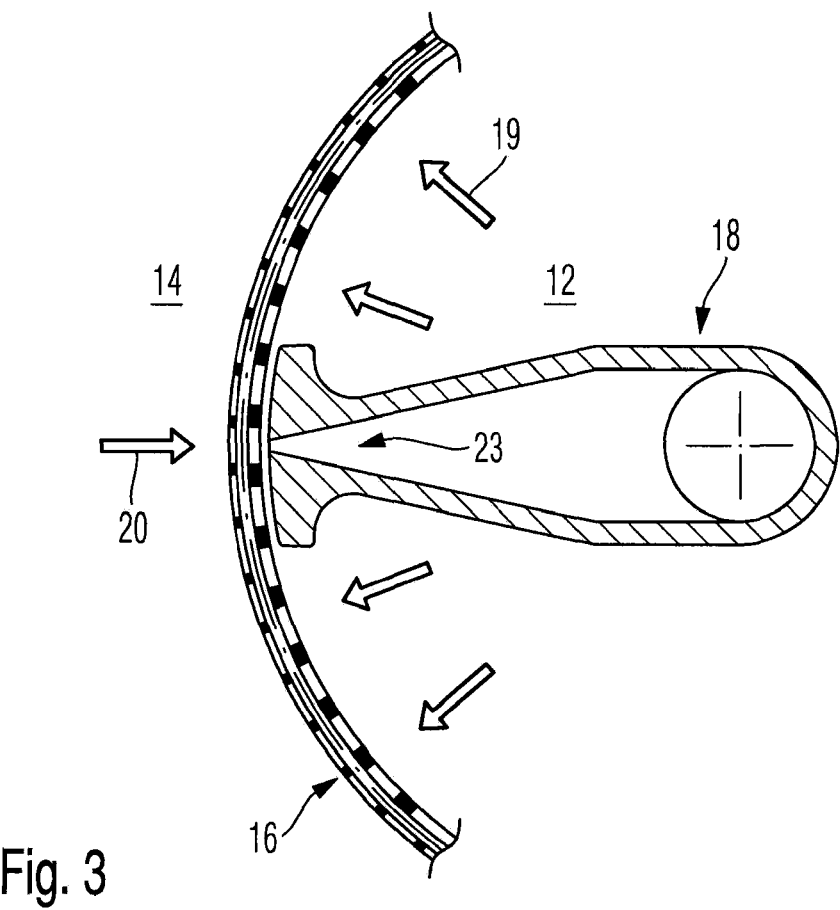
FIG. 3 shows a detail of the oil side-flow cleaning device of the present invention.

The backflush nozzle 18 shown in FIG. 3 cooperates with the backflush collecting tank 17 to backflush the filter medium 16. It is installed inside the first oil chamber 12 of the filter unit 10 in such a way that it can shift its position relative to the filter medium 16.

In the preferred embodiment of FIG. 3, the filter medium 16 has a cylindrical contour, wherein the backflush nozzle 18 can be shifted relative to the filter medium 16 in rotary fashion 12 inside the cylindrically contoured filter medium 16; that is, it can be shifted inside the first oil chamber around the entire circumference of the filter medium 16.

When, in filtration mode, it is determined that the filter medium 16 is blocked by the particles removed from the oil, the system is switched over to backflush mode, and the direction in which the oil flows through the filter medium 16 is changed. As a function of its position relative to the filter medium 16, the backflush nozzle 18 defines a backflush gap 23, through which oil can backflush the filter medium 16 in the second direction 20 as it flows to the unpressurized backflow collecting tank 17. During the backflush operation, the relative position between the backflush nozzle 18 and the filter medium 16 is changed by the relative movement between these two components, which makes it possible to backflush and thus clean all of the filter medium 16.

It is preferable for the backflush nozzle 18 to shift relative to the cylindrical filter medium 16 by rotation. Conversely, it is also possible, however, for the backflush nozzle 18 to be designed as a stationary component and for the filter medium 16 to rotate around its rotational axis.

The backflushing of the filter medium 16 in backflush mode therefore does not take place simultaneously around the entire circumference but rather progressively, occurring only at the moving point on the circumference where the backflush nozzle 18 is located, i.e., only where the backflush gap 23 defined by the backflush nozzle 18 present.

In the preferred exemplary embodiment of the invention shown here, the backflush unit comprises not only the backflush collecting tank 17 and the backflush nozzle 19 but also a backflush receiving tank 24, which is assigned to the second return line 8b. In the previously mentioned filtration mode of the inventive oil side-flow cleaning device 6, the backflush receiving tank 24 is first filled with suitable oil, wherein, after this backflush receiving tank 24 has been filled, cleaned oil can be sent from this receiving tank to the oil tank 2. In backflush mode of the inventive oil side-flow cleaning device 6, the cleaned oil which was collected in the backflush receiving tank 24 during filtration mode is now used to backflush the filter medium 16. In this mode, the shutoff element 13a is closed and the shutoff element 22 is opened, and this cleaned oil is conveyed in the second direction 20 from the second oil chamber 14 into the first oil chamber 12 of the filter unit 10 and thus flows through the filter medium 16 to be backflushed, this again taking place as a function of the position of the backflush nozzle 18 relative to the filter medium 16 to be backflushed.

For this purpose, a compressed air valve 32, which supplies compressed air to the backflush receiving tank 24, is opened, and the shutoff element 13b assigned to the second return line 8b is now closed.

It should be pointed out here that, although backflushing is preferably carried out with the oil collected in the backflush receiving tank 24, it is also possible for the filter medium 16 of the filter unit 10 to be backflushed in a different way. For example, backflushing can be realized by compressed air alone. For this purpose, the filter unit 10 is emptied of oil, and compressed air flows through the filter medium 16, thus removing the particles retained by the filter medium 16 from the medium, so that the particles can be collected as dry material in a collecting tank (not shown). In this case, therefore, an additional tank must be provided.

According to another embodiment, a backflush nozzle is positioned on the inflow side and another is positioned on the outflow side, thus one in the area of the first oil chamber 12 and the other in the area of the second oil chamber 14. The two nozzles are situated opposite each other, wherein the filter medium 16 is positioned between the two backflush nozzles. Then relative movement is produced between the backflush nozzles and the filter medium to accomplish the backflushing. In this case, the filter unit 10 would be filled with oil, and it would then be possible to carry out the backflushing operation by means of the two cooperating backflush nozzles.

Backflushing with compressed air can also be combined intermittently with backflushing with the oil collected in the backflush receiving tank 24. In this case, a period of backflushing with the oil collected in the backflush receiving tank 24 would alternate with a period of backflushing with compressed air.

Backflushing the filter medium could also be carried out with another device (not shown), such as a piston, a valve, or an ultrasonic sonotrode, in which case the backflushing of the filter medium 16 would be carried out in non-steady manner, i.e., by pulsation, with the cleaned oil collected in the backflush receiving tank 24.

It is thus possible, for example, to mount an ultrasonic sonotrode at the front end of the backflush gap 23 of the backflush nozzle 18 and to use this sonotrode to subject the oil used for backflushing to ultrasonic vibrations, which would have the effect of increasing the efficiency of the backflushing of the filter medium 16.

In the preferred exemplary embodiment of oil side-flow cleaning device 6, the device also comprises an oil recovery unit 25, which cooperates with the backflush collecting tank 17. It can be seen in FIG. 2 that the backflush collecting tank 17 can be connected to the feed line 7 by way of an oil line 26, to which a shutoff element 27 is assigned, wherein, branching off from this oil line 26, an oil line 28 is provided, to which another shutoff element 29 is assigned, wherein the oil recovery unit 25 is assigned to this oil line 28 leading back to the backflush collecting tank 17 downstream of the shutoff element 29. An oil pump 30 is assigned to the oil line 26 to convey oil from the backflush collecting tank 17 to the feed line 7 or to the oil recovery unit 25.

The oil recovery unit 25 serves to clean the oil used to backflush the filter medium 16 of the filter unit 10. So that the dirt particles can be removed from this oil collected in the backflush collecting tank 17, the shutoff element 27 is closed, the shutoff element 29 is opened, and the shutoff element 22 is closed. The oil can now be sent by the pump 30 through the oil recovery unit 25, which, for example, can be designed as a free jet centrifuge. In the area of the oil recovery unit 25, dirt particles are removed from the oil, so that cleaned oil is now present in the backflush collecting tank 17. With the shutoff element 29 closed and the shutoff element 27 opened, the oil cleaned in this way can then be conveyed by the pump 30 to the feed line 7 and thus returned to the main oil circuit of the oil system.

It is possible to carry out the oil recovery process with the help of the oil recovery unit 25 as described above in parallel with the filtration preparation process using the heating unit 11. It is possible in this way to minimize the setup times for the inventive oil side-flow cleaning device 6. The oil recovery process can also be carried out in parallel with standard filtration mode. This can also lead to a reduction in the setup times.

While the oil cleaned by the oil recovery unit 25 is to be returned from the backflush collecting tank 17 to the feed line 7, the pump 15 is turned off, so that the pump 30 can convey cleaned oil from the backflush collecting tank 17 to the feed line 7.

According to a modification, it is also possible to provide another oil tank in addition to the backflush collecting tank 17; this extra tank is used to allow oil to circulate via the oil recovery unit 25. In this case, it would then be possible to backflush the filter medium 16 in parallel with the oil recovery process. This variant is especially advantageous when the intervals between backflushings are short.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An oil side-flow cleaning device comprising:
    a filter unit (10) including a filter medium (16) for cleaning oil;
    a feed line for supplying said filter unit (10) with oil to be cleaned from an oil tank;
    a return line for returning cleaned oil from said filter unit (10) to the oil tank; and
    wherein, when said oil side-flow cleaning device is in filtration mode, oil flows through said filter medium (16) in a first direction;
    a backflush unit for said filter unit (10) comprising a backflush collecting tank (17) and a backflush nozzle (18), wherein, when the oil side-flow cleaning device is in backflush mode, oil flows through said filter medium (16) in a second, opposite direction as a function of the position of the backflush nozzle (18) relative to said filter medium (16) and arrives in said backflush collecting tank (17);
    a first oil line (26) connecting said backflush collecting tank (17) to said feed line (7);
    a shut off element (27) in said first oil line (26); and oil recovery unit (25) connected to said backflush collecting take (17); and
    an additional shutoff valve (29) operatively disposed between said first oil line (26) and said oil recovery unit (25).

2. The oil side-flow cleaning device according to claim 1, wherein said filter unit (10) comprises a first oil chamber (12) for oil to be cleaned and a second oil chamber (14) for cleaned oil, said first and second oil chambers being separated from each other by said filter medium (16); wherein the backflush nozzle (18) constructed to be shifted relative to said filter medium (16) inside said first oil chamber (12) and is connected to said backflush collecting tank (17).

3. The oil side-flow cleaning device according to claim 2, additionally comprising an oil line (21) connecting said backflush collecting tank (17) to said first oil chamber (12); a shutoff element (22) disposed in said oil line so that in filtration mode said shutoff element (22) is closed, whereas, in backflush mode, said shutoff element (22) is opened.

4. The oil side-flow cleaning device according to claim 1, wherein said backflush unit comprises a backflush receiving tank (24), wherein, in filtration mode, said backflush receiving tank can first be filled with cleaned oil as the oil flows through said filter medium (16) in the first direction, and then cleaned oil can be returned from said backflush receiving tank (24) to the oil tank (2), and wherein, in backflush mode, cleaned oil can be conveyed from said backflush receiving tank (24), through said filter medium (16) in the second direction as a function of the position of said backflush nozzle (18) relative to said filter medium (16), and to said backflush collecting tank (17).

5. The oil side-flow cleaning device according to claim 1, wherein said backflush unit comprises an oil recovery unit (25) cooperating with said backflush collecting tank (17).

* * * * *